(12) United States Patent
Shuster

(10) Patent No.: US 11,061,971 B2
(45) Date of Patent: Jul. 13, 2021

(54) METHOD AND APPARATUS FOR PHOTOGRAPH FINDING

(71) Applicant: Intellectual Ventures I LLC, Wilmington, DE (US)

(72) Inventor: Gary Stephen Shuster, Fresno, CA (US)

(73) Assignee: Intellectual Ventures I LLC, Wilmington, DE (US)

( * ) Notice: Subject to any disclaimer, the term of this patent is extended or adjusted under 35 U.S.C. 154(b) by 0 days.

(21) Appl. No.: 17/020,671

(22) Filed: Sep. 14, 2020

(65) Prior Publication Data

US 2020/0410015 A1    Dec. 31, 2020

Related U.S. Application Data

(63) Continuation of application No. 16/105,876, filed on Aug. 20, 2018, now Pat. No. 10,776,430, which is a continuation of application No. 15/481,595, filed on Apr. 7, 2017, now Pat. No. 10,055,497, which is a continuation of application No. 14/518,655, filed on Oct. 20, 2014, now Pat. No. 9,619,486, which is a continuation of application No. 13/776,463, filed on
(Continued)

(51) Int. Cl.
| | |
|---|---|
| *G06F 16/951* | (2019.01) |
| *G06F 16/50* | (2019.01) |
| *G06F 16/58* | (2019.01) |
| *G06F 16/583* | (2019.01) |
| *G06K 9/62* | (2006.01) |

(52) U.S. Cl.
CPC ............ *G06F 16/951* (2019.01); *G06F 16/50* (2019.01); *G06F 16/58* (2019.01); *G06F 16/583* (2019.01); *G06F 16/5838* (2019.01); *G06F 16/5854* (2019.01); *G06K 9/6201* (2013.01); *Y10S 707/99933* (2013.01); *Y10S 707/99936* (2013.01)

(58) Field of Classification Search
CPC ............... G06K 9/0061; G06K 9/0063; G06K 9/00664; G06K 9/00771; G06T 2207/10032; G06T 7/73
See application file for complete search history.

(56) References Cited

U.S. PATENT DOCUMENTS

| | | |
|---|---|---|
| 5,280,530 A | 1/1994 | Trew et al. |
| 5,748,904 A | 5/1998 | Huang et al. |
| (Continued) | | |

*Primary Examiner* — Yosef Kassa
(74) *Attorney, Agent, or Firm* — Kowert, Hood, Munyon, Rankin & Goetzel, P.C.

(57) ABSTRACT

Digital image data including discrete photographic images of a variety of different subjects, times, and so forth, are collected and analyzed to identify specific features in the photographs. In an embodiment of the invention, distinctive markers are distributed to aid in the identification of particular subject matter. Facial recognition may also be employed. The digital image data is maintained in a database and quarried in response to search requests. The search requests include criteria specifying any feature category or other identifying information, such as date, time, and location that each photograph was taken, associated with each photograph. Candidate images are provided for review by requesters, who may select desired images for purchase or downloading.

20 Claims, 2 Drawing Sheets

Related U.S. Application Data

Feb. 25, 2013, now Pat. No. 8,867,798, which is a continuation of application No. 13/090,026, filed on Apr. 19, 2011, now Pat. No. 8,385,691, which is a continuation of application No. 12/874,929, filed on Sep. 2, 2010, now Pat. No. 7,929,810, which is a continuation of application No. 12/325,589, filed on Dec. 1, 2008, now Pat. No. 7,844,141, which is a continuation of application No. 11/056,699, filed on Feb. 10, 2005, now Pat. No. 7,460,737.

(60) Provisional application No. 60/544,570, filed on Feb. 12, 2004.

(56) References Cited

U.S. PATENT DOCUMENTS

| | | | |
|---|---|---|---|
| 5,793,371 | A | 8/1998 | Deering |
| 5,835,244 | A | 11/1998 | Bestmann |
| 5,848,410 | A | 12/1998 | Walls et al. |
| 5,912,980 | A | 6/1999 | Hunke |
| 5,926,647 | A | 7/1999 | Adams et al. |
| 5,926,812 | A | 7/1999 | Hilsenrath et al. |
| 6,094,649 | A | 7/2000 | Bowen et al. |
| 6,353,840 | B2 | 3/2002 | Saito et al. |
| 6,397,213 | B1 | 5/2002 | Cullen et al. |
| 6,421,675 | B1 | 7/2002 | Ryan et al. |
| 6,424,587 | B1 | 7/2002 | Hosoda |
| 6,530,944 | B2 | 3/2003 | West et al. |
| 6,557,102 | B1 * | 4/2003 | Wong ............ G16H 30/20 713/176 |
| 6,564,214 | B1 | 5/2003 | Bhide |
| 6,608,923 | B1 | 8/2003 | Zhang et al. |
| 6,654,758 | B1 | 11/2003 | Teague |
| 6,658,408 | B2 | 12/2003 | Yano et al. |
| 6,690,828 | B2 | 2/2004 | Meyers |
| 6,738,653 | B1 | 5/2004 | Sfez et al. |
| 6,772,150 | B1 | 8/2004 | Whitman et al. |
| 6,778,697 | B1 | 8/2004 | Shin et al. |
| 6,792,434 | B2 | 9/2004 | Moghaddam et al. |
| 6,873,806 | B2 | 3/2005 | Kobayashi et al. |
| 6,894,494 | B2 | 5/2005 | Stergiopoulos et al. |
| 6,898,582 | B2 | 5/2005 | Lange |
| 6,919,892 | B1 | 7/2005 | Cheiky |
| 6,944,319 | B1 * | 9/2005 | Huang ............ G06K 9/00288 382/118 |
| 6,963,663 | B1 | 11/2005 | Yoshida |
| 6,975,418 | B1 | 12/2005 | Ohta et al. |
| 6,982,811 | B2 | 1/2006 | Sato |
| 7,006,881 | B1 | 2/2006 | Hoffberg |
| 7,027,054 | B1 | 4/2006 | Cheiky et al. |
| 7,031,555 | B2 * | 4/2006 | Troyanker ......... G06K 9/00624 382/305 |
| 7,110,996 | B2 | 9/2006 | Kawamura |
| 7,112,806 | B2 | 9/2006 | Lussier |
| 7,140,535 | B2 | 11/2006 | Sussman |
| 7,171,058 | B2 | 1/2007 | Luo |
| 7,174,332 | B2 | 2/2007 | Baxter et al. |
| 7,181,480 | B1 | 2/2007 | Nikiel et al. |
| 7,184,814 | B2 | 2/2007 | Lang et al. |
| 7,209,653 | B2 * | 4/2007 | Umeda ............ G06Q 30/06 355/40 |
| 7,231,243 | B2 | 6/2007 | Tearney et al. |
| 7,233,684 | B2 | 6/2007 | Fedorovskaya et al. |
| 7,236,264 | B2 | 6/2007 | Kanno |
| 7,259,785 | B2 | 8/2007 | Stavely et al. |
| 7,266,544 | B1 | 9/2007 | Dodge et al. |
| 7,286,723 | B2 | 10/2007 | Taugher et al. |
| 7,286,871 | B2 | 10/2007 | Cohen |
| 7,287,253 | B2 | 10/2007 | Yamamura et al. |
| 7,298,931 | B2 | 11/2007 | Kim et al. |
| 7,302,057 | B2 | 11/2007 | Rotholtz et al. |
| 7,308,550 | B2 | 12/2007 | Cornett |
| 7,319,780 | B2 | 1/2008 | Fedorovskaya et al. |
| 7,333,963 | B2 | 2/2008 | Widrow et al. |
| 7,346,631 | B2 | 3/2008 | Amirghodsi |
| 7,356,512 | B2 | 4/2008 | Okita et al. |
| 7,359,535 | B2 | 4/2008 | Salla et al. |
| 7,366,994 | B2 | 4/2008 | Loui |
| 7,379,627 | B2 | 5/2008 | Li et al. |
| 7,382,903 | B2 | 6/2008 | Ray |
| 7,388,693 | B2 | 6/2008 | Ahmed et al. |
| 7,418,116 | B2 | 8/2008 | Fedorovskaya et al. |
| 7,428,744 | B1 | 9/2008 | Ritter |
| 7,440,594 | B2 | 10/2008 | Takenaka |
| 7,447,353 | B2 * | 11/2008 | Diederichs .......... B41F 33/0036 382/165 |
| 7,467,160 | B2 * | 12/2008 | McIntyre ............ G07F 17/0014 |
| 7,474,808 | B2 | 1/2009 | Ozaki et al. |
| 7,499,916 | B2 | 3/2009 | Liu et al. |
| 7,555,148 | B1 | 6/2009 | Steinberg et al. |
| 7,562,299 | B2 | 7/2009 | Millar et al. |
| 7,564,994 | B1 | 7/2009 | Steinberg et al. |
| 7,580,985 | B2 * | 8/2009 | Motoyama ............ G06F 3/1204 709/208 |
| 7,583,294 | B2 | 9/2009 | Ray et al. |
| 7,596,247 | B2 | 9/2009 | Ioffe |
| 7,609,864 | B2 | 10/2009 | Nagasaka et al. |
| 7,639,898 | B1 | 12/2009 | Chan |
| 7,660,445 | B2 | 2/2010 | Ray |
| 7,706,633 | B2 | 4/2010 | Chefd'hotel et al. |
| 7,711,145 | B2 | 5/2010 | Gallagher |
| 7,715,659 | B2 | 5/2010 | Zhao et al. |
| 7,813,822 | B1 | 10/2010 | Hoffberg |
| 7,843,495 | B2 | 11/2010 | Aas et al. |
| 7,860,320 | B2 | 12/2010 | Luo et al. |
| 7,881,506 | B2 | 2/2011 | Nagasaka et al. |
| 7,921,020 | B2 | 4/2011 | Kalies |
| 7,941,197 | B2 | 5/2011 | Jain et al. |
| 7,941,442 | B2 | 5/2011 | Li |
| 7,991,194 | B2 * | 8/2011 | Kim ....................... H04L 67/18 382/103 |
| 8,005,272 | B2 | 8/2011 | Grim, III et al. |
| 8,010,555 | B2 * | 8/2011 | Eichhorn .............. G06F 16/148 707/770 |
| 8,064,650 | B2 | 11/2011 | Webb |
| 8,065,611 | B1 | 11/2011 | Chan et al. |
| 8,150,584 | B2 | 4/2012 | Mackin et al. |
| 8,199,979 | B2 | 6/2012 | Steinberg et al. |
| 8,209,330 | B1 * | 6/2012 | Covell .................. G06F 16/951 707/728 |
| 8,224,849 | B2 | 7/2012 | Li |
| 8,316,237 | B1 | 11/2012 | Felsher |
| 8,374,466 | B2 | 2/2013 | Webb |
| 8,460,103 | B2 | 6/2013 | Mattice et al. |
| 8,531,474 | B2 | 9/2013 | Chang et al. |
| 8,543,573 | B2 | 9/2013 | MacPherson |
| 8,583,263 | B2 | 11/2013 | Hoffberg |
| 8,788,493 | B2 * | 7/2014 | Stallings ............ H04N 5/23293 707/736 |
| 9,098,584 | B1 * | 8/2015 | Fredinburg ........... G06F 16/532 |

* cited by examiner

METHOD AND APPARATUS FOR PHOTOGRAPH FINDING

CROSS-REFERENCE TO RELATED APPLICATIONS

The present application is a continuation of U.S. application Ser. No. 16/105,876, filed Aug. 20, 2018, which is a continuation of U.S. application Ser. No. 15/481,595, filed Apr. 7, 2017, which is a continuation of U.S. application Ser. No. 14/518,655, filed Oct. 20, 2014 (now U.S. Pat. No. 9,619,486), which is a continuation of application Ser. No. 13/776,463, filed Feb. 25, 2013 (now U.S. Pat. No. 8,867, 798), which is a continuation of U.S. application Ser. No. 13/090,026, filed Apr. 19, 2011 (now U.S. Pat. No. 8,385, 691), which is a continuation of U.S. application Ser. No. 12/874,929, filed Sep. 2, 2010 (now U.S. Pat. No. 7,929, 810), which is a continuation of U.S. application Ser. No. 12/325,589, filed Dec. 1, 2008 (now U.S. Pat. No. 7,844, 141), which is a continuation of U.S. application Ser. No. 11/056,699, filed Feb. 10, 2005 (now U.S. Pat. No. 7,460, 737), which claims priority to U.S. Provisional Appl. No. 60/544,570, filed Feb. 12, 2004; the disclosures of each of the above-referenced applications are incorporated by reference herein in their entireties.

BACKGROUND OF THE INVENTION

Field of the Invention

Photography has transformed how people conceive of the world. Photographs allow people to see all sorts of things that are actually many miles away and/or years preceding. Photography lets people capture moments in time and preserve them for years to come.

Often people at a public place notice that a stranger has taken a photograph of which they would love to have a copy, Alternatively, after going somewhere, a person may bemoan the fact that he did not have a photograph of the event (in the present context, photograph also includes video, audio, or other representation).

A need exists, therefore, to provide a method and apparatus for identifying and connecting people with photographs they want. In addition, there is a need to provide a method and apparatus for characterizing errant photographs stored on computer databases that makes use of a variety of attributes to reliably characterize photographs in such a way as to reduce the amount of manual review necessary to identify and connect people with the photographs they want.

SUMMARY OF THE INVENTION

The present invention provides a method and apparatus that matches people with photographs in which they accidentally (or purposely) appear or with photographs of events they have attended.

Specifically, in one embodiment, a web site is created with a database backend. The database is seeded with information provided by (1) the photographer; (2) recovering metadata from the photograph; (3) reading devices such as a Global Positioning System (GPS) device; (4) referencing the account data of the photographer (i.e., account number, photographer's zip code or area code, etc.); (5) analyzing the photograph (i.e., computer recognizes eye color, optical character recognizes any text found in the photograph, recognizes the number of persons, the gender of persons, the hair color, the time of day by optical character recognizing any clocks in the photograph or analyzing the lighting conditions, the weather, etc.); (6) photograph quality information; and/or (7) any other information.

A user looking for a photograph would visit the web site and search for certain criteria. The user is then provided with a gallery of thumbnails that match the criteria. When the user identifies a photograph he wants to own, he can then download the full quality version, or order print(s). In a preferred implementation, the user is charged some amount of money that is split between the site owner and the photographer. Alternatively, the user may be charged in some other way, such as by viewing advertisements or by exchanging credits for downloads or by some other payment or a combination thereof.

A more complete understanding of the present invention will be afforded to those skilled in the art, as well as a realization of additional advantages and objects thereof, by a consideration of the following detailed description of the preferred embodiments.

DETAILED DESCRIPTION OF THE PREFERRED EMBODIMENTS

The present invention provides a method and apparatus that matches people with photographs in which they accidentally (or purposely) appear or with photographs of events they have attended.

Figure 1:
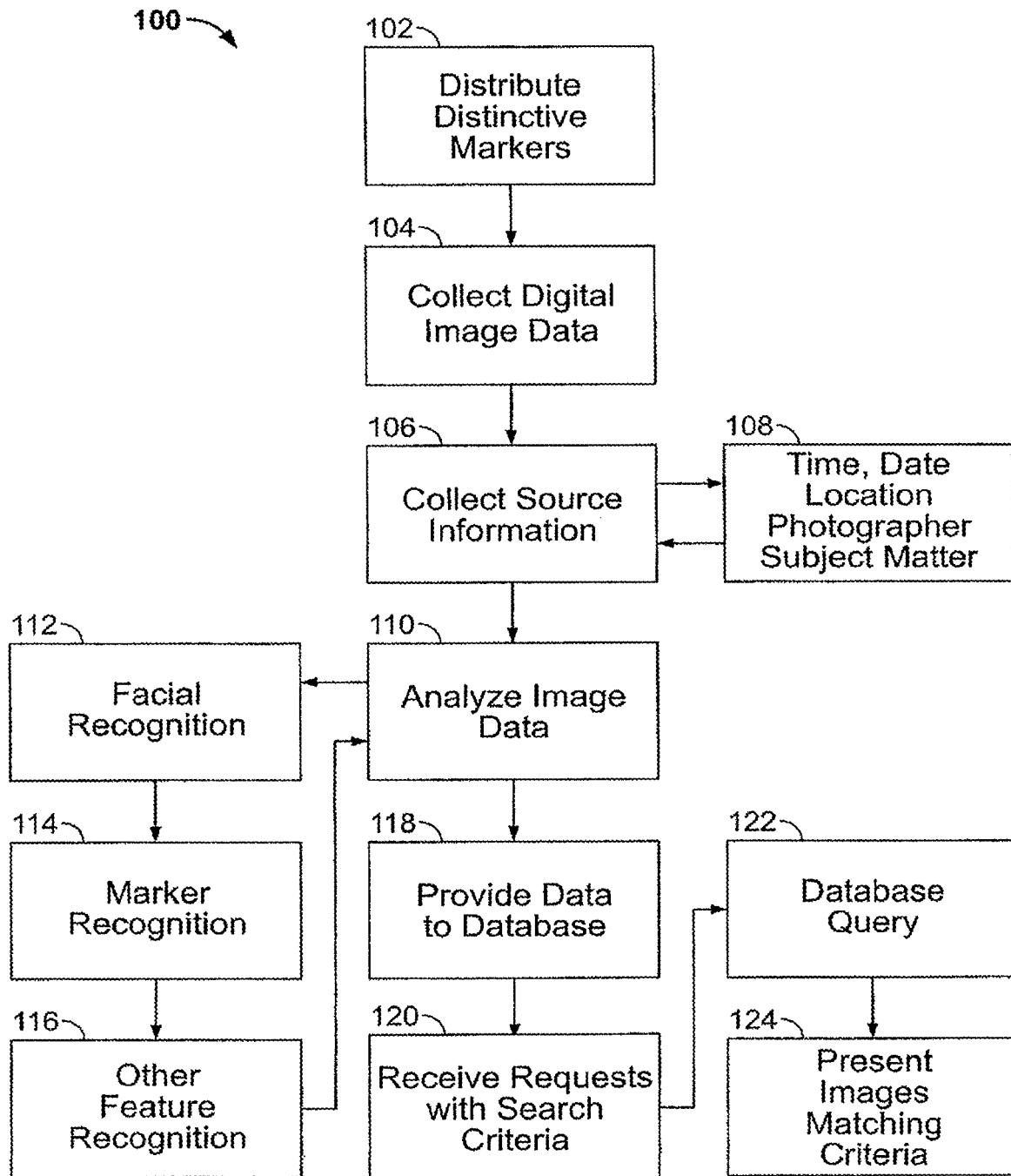
FIG. 1 is a flow diagram showing exemplary steps of a method according to the invention.

FIG. 1 illustrates exemplary steps of a method 100 according to the invention. At optional step 102, distinctive markers may be distributed to persons desiring to contribute photographic images to a database. The markers may comprise, for example, distinctive bins, badges, or stickers for placing on objects to be photographed. The markers should be designed so as to be easily recognized using automatic recognition algorithms, but should not be too conspicuous.

At step 104, image data is collected from a variety of sources. It may be desirable to accept material from as many sources as possible, to increase the number of images available for browsing. Optionally, images may be accepted from qualified sources only.

At step 104, source information regarding each photograph is collected. For example, at step 108, the image provider may be asked for information, such as the time and date of the photograph, the subject matter, location, photographer, etc. Image metadata may also be read to obtain such information. Other ways of associating images to identifying information may include, for example, reading devices such as a Global Positioning System (GPS) device attached to a camera or other image capture device, or by referencing account data of the image contributor (e.g., account number, photographer's zip code or area code, etc.).

At step 110, image data is analyzed to identify any characteristics that may be of interest to users. Such characteristics may include, for example, eye color, words and sentences, a number or gender of persons, the hair color, time of day, lighting conditions, and so forth. For further example, at step 112, a facial recognition program as known in the art may be used to analyze any faces appearing in the photos at a sufficiently high resolution. At step 114, the images may be analyzed for the presence of any known markers. And at step 116, other features and qualities of the image may be classified, for example, whether it is taken indoors or outdoors, whether it contains people, dogs, cats, or other animals, whether it contains automobiles, airplanes, or other objects, and so forth. At step 118, selected feature information and other source information is associated with each image and provided to any suitable relational database.

At step 120, requests specifying search criteria for photographic images are received. For example, a user looking for a photograph may visit a web site hosted by the system and fill out a search form specifying search criteria of interest. The criteria may include specific subject matter, times, dates, and locations. For example, "Disneyland AND Matterhorn AND blue eye AND child AND Jan. 1, 2004 AND morning" would search for a photograph or photographs taken at Disneyland's Matterhorn with a child who has blue eyes on the morning of Jan. 1, 2004.

At step 122, the image database is queried as known in the art, to identify images that at least partially match the search criteria. Such images may be presented, at step 124, to the user. For example, the user may be provided with a gallery of "thumbnail" (reduced-size) images generated from images that match the criteria. When the user identifies a photograph he wants to own, he can then download the full quality version, or order print(s). In a preferred implementation, the user is charged some amount of money that is split between the site owner and the photographer. Alternatively, the user may be charged in some other ways such as by viewing advertisements or by exchanging credits for downloads or by some other payment or a combination thereof. The price can be on a sliding scale depending on the quality of the photograph that the user downloads or the size or quality of the print. For example, a photograph may cost $1.00 for 1024×768 resolution or $2.00 for 1600×1200 resolution. Similarly, a print may cost $1.00 for 3×5 or $5 for 8×10. For downloads, an "upgrade" may be possible by charging the difference between the resolutions. An automated process may be used to reduce the number of pixels for purposes of having a lower quality version to sell.

In addition, a surcharge may be applied (even if no surcharge is required) for various enhancements to the photograph, such as "upconverting" to a higher resolution, eliminating red-eye, enhancing shadow, color, or brightness, etc.

Moreover, when a photographer takes photographs, he can be provided with printed cards bearing a Uniform Resource Locator (URL) and a unique code in order that the user would be able to enter into the web site to find the photograph or the series of photographs then being taken. The photographer can also distribute cards (the printed cards bearing the URL and the unique code or any other cards known to those skilled in the art) to people whom he photographs, whether intentionally or inadvertently. The photographer can further advertise the same (e.g., the URL and the unique code) via a mark on his camera, a T-shirt, or other means.

Fixed-place cameras can also serve this function (e.g., the of photographer). For example, a camera set up at an intersection in Hollywood might take and upload one photograph every 10 seconds.

Photographers can also be given accounts and be allowed to upload photographs to the site. The database is populated during this process, although additional database information can be added later by web site users. In addition, the number of times the photograph has been purchased and/or viewed can be a part of the database.

In one embodiment, the method and apparatus of the present invention should be capable of face recognition. It should assign values to various factors (i.e., ratio of distance between pupils to distance to tip of nose, etc.). It would add this information to the database for uploaded photographs. A user can then upload a photograph of the target person and the system would then generate the same data from that photograph and use it to limit the possible search targets.

Figure 2:
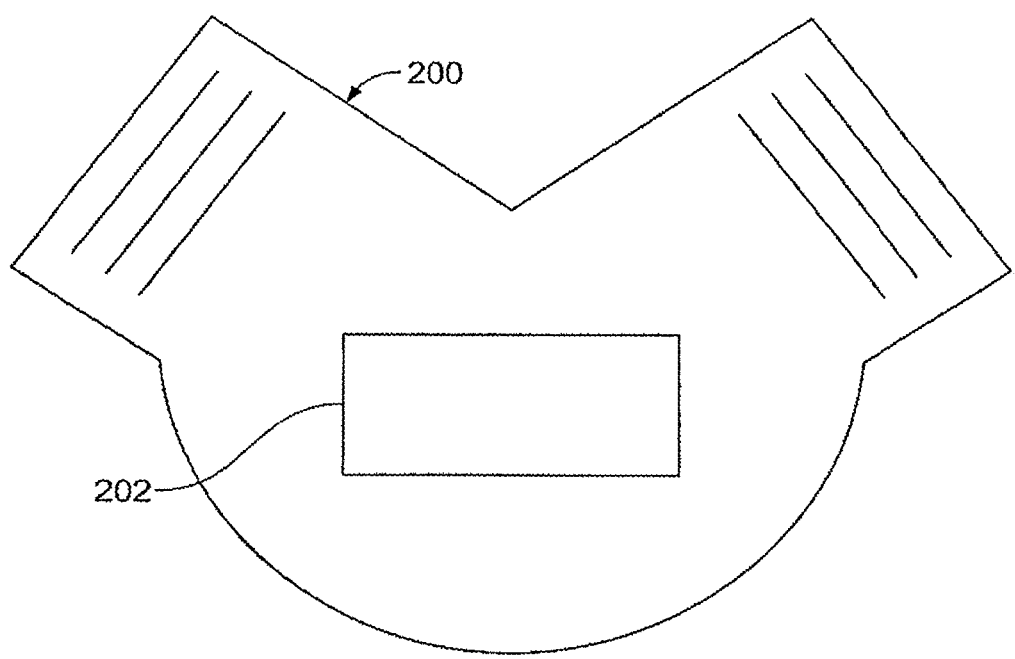
FIG. 2 is a diagram showing an exemplary distinctive marker for photographic data.

A provider of the present method and apparatus or a photographer can also hand out pins, clothing, or other materials that are marked in a way that allows a computer to later recognize them in a photograph. FIG. 2 shows an exemplary distinctive marker 200 having an optical code 202, such as a bar code. The marker may have a color combination, distinctive shape, lettering, bar code, or other optical pattern, or some combination of the foregoing, that is unique to the marker. The marker may be computer generated, for example, and produced using an end-user's laser or ink-jet printer. The marker may be associated with specific information, for example, a particular user account, photographer, subject matter type, person, event, or location. Users can later search for photographs containing an image of the marker.

Numerous distribution mechanisms exist whereby photographs may be distributed from a source over a wide area network, such as the Internet. In some cases, the photographs are distributed using a centralized server system (such as Napster 2.0, eBay, or from a web site). In other cases, the photographs are distributed using a decentralized system (such as Gnutella). In a preferred implementation, the photographs are distributed to a person using the centralized server system or using a central hub.

Embodiments of the present invention operate in accordance with at least one web-hosting mechanism and a plurality of user mechanisms communicating over a wide area network, such as the Internet. Specifically, a web-hosting mechanism includes a database, an interface application and a server, wherein the server is adapted to communicate with a plurality of user mechanisms over a wide area network. It should be appreciated that the mechanisms described can include, but are not limited to, personal computers, mainframe computers, personal digital assistances, wireless communication devices and all other physical and wireless connected network devices generally known to those skilled in the art. It should further be understood that the database depicted can include, but is not limited, to RAM, cache memory, flash memory, magnetic disks, optical disks, removable disks, SCSI disks, IDE hard drives, tape drives, and all other types of data storage devices (and combinations thereof, such as RAID devices) generally known to those skilled in the art. In addition, the mechanisms described above are for purposes of example only and the invention is not limited thereby.

Having thus described several embodiments for photograph finding, it should be apparent to those skilled in the art that certain advantages of the system have been achieved. It should also be appreciated that various modifications, adaptations, and alternative embodiments thereof may be made within the scope and spirit of the present invention. For example, in the context of the present invention a photograph can include video, audio, and/or other representation of how people conceive of the world. The invention is defined by the following claims.

What is claimed is:

1. A method, comprising:
a computer system receiving, via a wide area network, a search request that includes an uploaded digital image;

the computer system determining one or more characteristics of the digital image, including source information for the digital image, wherein the source information indicates one or more of: a device used to capture the image or a geographic location at which the image was captured;

the computer system searching, using the determined one or more characteristics, information specifying characteristics of respective ones of a plurality of stored digital images;

the computer system selecting one or more of the plurality of stored digital images, based on a comparison of the determined one or more characteristics and one or more characteristics specified by the information, wherein the compared one or more characteristics include source information of respective ones of the stored digital images that indicates one or more of: devices used to capture the respective ones of the stored digital images or geographic locations at which the respective ones of the stored digital images were captured; and the computer system returning, via the wide area network, the selected one or more digital images.

2. The method of claim 1, wherein the plurality of stored digital images were submitted via the wide area network.

3. The method of claim 1, wherein the source information of the respective ones of the stored digital images further indicates a user account of a contributor of the respective ones of the stored digital images.

4. The method of claim 1, wherein the source information of the respective ones of the stored digital images further indicates a photographer that captured the respective ones of the stored digital images.

5. The method of claim 1, wherein the source information of the uploaded digital image indicates both a device used to capture the image and the geographic location at which the image was captured.

6. The method of claim 1, wherein the geographic location at which the uploaded digital image was captured was determined by a positioning device.

7. The method of claim 1, wherein the returning includes causing reduced-size versions of the selected one or more digital images to be displayed via a web site.

8. The method of claim 1, further comprising:
the computer system receiving one or more search parameters based on user input;
wherein the selecting is further based on a comparison of the one or more search parameters with parameters corresponding to respective ones of the plurality of stored digital images.

9. A system, comprising:
one or more processors; and
one or more memories having program instructions stored thereon that are executable by the one or more processors to cause the system to perform operations comprising:
receiving, via a wide area network, a search request that includes an uploaded digital image;
determining one or more characteristics of the digital image, including source information for the digital image, wherein the source information indicates one or more of: a device used to capture the image or a geographic location at which the image was captured;
searching, using the determined one or more characteristics, information specifying characteristics of respective ones of a plurality of stored digital images;
selecting one or more of the plurality of stored digital images, based on a comparison of the determined one or more characteristics and one or more characteristics specified by the information, wherein the compared one or more characteristics include source information of respective ones of the stored digital images that indicates one or more of: devices used to capture the respective ones of the stored digital images or geographic locations at which the respective ones of the stored digital images were captured; and
returning, via the wide area network, the selected one or more digital images.

10. The system of claim 9, wherein the plurality of stored digital images were submitted via the wide area network.

11. The system of claim 9, wherein the source information of the respective ones of the stored digital images further indicates a user account of a contributor of the respective ones of the stored digital images.

12. The system of claim 11, wherein the source information of the uploaded digital image indicates both a device used to capture the image and a geographic location at which the image was captured.

13. A non-transitory computer-readable medium having instructions stored thereon that are executable by a computing device to perform operations comprising:
receiving, via a wide area network, a search request that includes an uploaded digital image;
determining one or more characteristics of the digital image, including source information for the digital image, wherein the source information indicates one or more of: a device used to capture the image or a geographic location at which the image was captured;
searching, using the determined one or more characteristics, information specifying characteristics of respective ones of a plurality of stored digital images;
selecting one or more of the plurality of stored digital images, based on a comparison of the determined one or more characteristics and one or more characteristics specified by the information, wherein the compared one or more characteristics include source information of respective ones of the stored digital images that indicates one or more of devices used to capture the respective ones of the stored digital images or geographic locations at which the respective ones of the stored digital images were captured; and
returning, via the wide area network, the selected one or more digital images.

14. The non-transitory computer-readable medium of claim 13, wherein the plurality of stored digital images were submitted via the wide area network.

15. The non-transitory computer-readable medium of claim 13, wherein the source information of the respective ones of the stored digital images further indicates a user account of a contributor of the respective ones of the stored digital images.

16. The non-transitory computer-readable medium of claim 13, wherein the source information of the uploaded digital image further indicates a photographer that captured an image.

17. The non-transitory computer-readable medium of claim 13, wherein the source information of the uploaded digital image indicates a device used to capture the image.

18. The non-transitory computer-readable medium of claim 13, wherein the geographic location at which the uploaded digital image was captured was determined by a positioning device.

19. The non-transitory computer-readable medium of claim 13, wherein the returning includes causing reduced-size versions of the selected one or more digital images to be displayed via a web site.

20. The non-transitory computer-readable medium of claim 13, wherein the operations further comprise:
   receiving one or more search parameters based on user input;
   wherein the selecting is further based on a comparison of the one or more search parameters with parameters corresponding to respective ones of the plurality of stored digital images.

* * * * *